United States Patent [19]

Watanabe

[11] Patent Number: 5,012,082
[45] Date of Patent: Apr. 30, 1991

[54] TWO-DIMENSIONAL INCIDENT POSITION DETECTOR DEVICE FOR LIGHT OR RADIATION

[75] Inventor: Mitsuo Watanabe, Hamamatsu, Japan

[73] Assignee: Hamamatsu Photonics K.K., Japan

[21] Appl. No.: 483,637

[22] Filed: Feb. 23, 1990

[30] Foreign Application Priority Data

Mar. 1, 1989 [JP] Japan .................................. 1-48800
Jan. 29, 1990 [JP] Japan .................................. 2-18199

[51] Int. Cl.⁵ ............................................ G01D 21/00
[52] U.S. Cl. ................................. 250/208.2; 250/369; 250/349
[58] Field of Search ............... 250/208.3, 208.2, 203.3, 250/369, 349, 382, 363.02; 382/68, 27; 358/125, 126

[56] References Cited

U.S. PATENT DOCUMENTS

4,672,542  6/1987  Roux et al. ........................... 250/369
4,852,056  7/1989  Rogers et al. ......................... 250/369

FOREIGN PATENT DOCUMENTS

0130095  1/1985  France .................................. 250/369
1573142  8/1980  United Kingdom .
1605009 12/1981  United Kingdom .
1605010 12/1981  United Kingdom .
2208256  3/1989  United Kingdom .
2218507 11/1989  United Kingdom .

*Primary Examiner*—Carolyn E. Fields
*Assistant Examiner*—Drew A. Dunn
*Attorney, Agent, or Firm*—Oliff & Berridge

[57] ABSTRACT

A two-dimensional incident position detector device for radiation, the device comprising a detector array including a plurality of detection cells in two-dimensional arrangement, and a comparator circuit for comparing an output from a noticed detection cell with outputs from all detection cells adjacent to said noticed cell, whereby a position of the noticed cell is decided as an incident position of light or radiation when the output from the noticed cell is larger than the outputs from all adjacent detection cells.

10 Claims, 7 Drawing Sheets

TWO-DIMENSIONAL INCIDENT POSITION DETECTOR DEVICE FOR LIGHT OR RADIATION

BACKGROUND OF THE INVENTION

1. Field of the Invention

The present invention relates to a two-dimensional incident position detector device for light or radiation and more specifically to that suitable for use in a position detector with use of a two-dimensional multi-anode photomultiplier (PMT) or a two-dimensional photo diode array, and capable of detection of a two-dimensional incident position of light or radiation at a high speed.

2. Description of the Prior Art

Conventionally, there are known varieties of position estimation methods to detect an incident position of light or radiation by a two-dimensional position detector. For example, a position detecting method of a two-dimensional multi-wired PMT includes a center-of-gravity position estimating system and a delay line system, etc.

In the center-of-gravity position estimating system, as illustrated in FIG. 6, electric wires in X and y directions are connected respectively to each other through resistors and output signals ($X_1$, $X_2$) from both ends of the connected resistors in the X direction for example are added. An incident position of light or radiation is evaluated by dividing a signal yielded from one end ($X_1$ for example) by the added value (in case of the X direction). The same evaluation is performed in the Y direction and an incident position of light or radiation is estimated from an intersecting point of the X and Y directional incident positions.

In the delay line system, weight of delay is previously given to each electric wire, and an incident position of light or radiation is estimated by identifying upon which wire a signal is incident on the basis of differences among arrival times of output signals through respective wires. The estimation is performed for X and Y directions and a two-dimensional incident position of the light or radiation is estimated as an intersecting point of the respective identified wires.

Additionally, there is known a system where position information is detected independently by each detection cell of a detector array. In a system all outputs from the detection cells are rendered to analog-digital (A/D) conversion parallelly, once stored in a memory, and thereafter subjected to data processing to provide a two-dimensional incident position of light or radiation. There has also been devloped another system wherein energy discriminators are simply used, and a position of the detection cell for which an output from the discriminator exceeds a given threshold is taken as an incident position.

Furthermore, there is also known a general system wherein a television camera and a CCD camera, etc., are used to estimate an incident position of light or radiation through scanning and reading thereof.

Those conventional methods however have the following difficulties:

In the center-of-gravity position estimating system, although positional resolution is highly accurate, it requires arithmetic operation with a result of a response speed being reduced and a processing circuit being complicated. Additionally, a result of the arithmetic operation is in need of correction because the detector is varied in its characteristics, and further makes the circuit complex. Moreover, processing is impossible of any multi-event phenomenon wherein the lights or radiations incident upon another location simultaneously.

In the delay line system, the incident position is decided by the amount of the delay times and hence the response speed of the device can not be improved in principle.

In the system where outputs from all detection cells are rendered to A/D conversion, stored in a memory, and thereafter the incident position is estimated, the associated circuit is enormous and arithmetic operation is ultimately required, thus lacking in real time property.

Still more, in the system wherein the energy discriminator is used, if incident light or radiation spreads over two or more detection cells, those cells output signals indicative of incident positions. Therefore, it can not be decided in this situation which position is an actual one, and hence those signals are eliminated as an error.

Furthermore, in the system wherein a television camera or a CCD camera is employed, the system is a scanning one to read successively two-dimensional input information one-dimensionally, and hence it is limited in a response speed and mistaken counts are increased upon a higher count rate owing to overlapped counts.

To solve such difficulties, the present applicant has already disclosed an incident position detector device for light or radiation in Japanese Laid-Open Patent Publication No. 63-300986. In this prior device, as illustrated in FIG. 7, a number of comparators are provided for mutually comparing output from detection cells. Outputs from those comparators are changed around an electric wire (No. 5 in the figure) corresponding to a peak position of the electron distribution produced by incident light or radiation. Therefor, a wire position corresponding to the change in the comparator outputs is taken as the incident position of the light or radiation.

The incident position detector device, however, compares the electron distribution produced by the incident light or radiation only in a one-dimensional direction, and hence is in need of, for deciding a two-dimensional incident position, the like decision on the incident position also in the remaining direction. From this reason, when lights or radiations are incident in two or more locations of the wires at the same time for example, it is impossible to decide an incident position and those incidences are needed to be removed as an error, followed by a reduced rate of counts of the signal.

SUMMARY OF THE INVENTION

In view of the drawbacks with the prior art, it is an object of the present invention to provide a two-dimensional position detector device capable of effectively detecting a two-dimensional incident position of radiation including light at a high speed.

To achieve the above object, a two-dimensional incident position detector device acording to the present invention comprises a detector array including a plurality of detection cells in two-dimension arrangement, comparator means for comparing an output from a noticed detection cell among the detection cells with outputs from all other detection cells adjacent ot the notice cell, and incident position determining means for determining a position of the noticed cell as an incident position of light or radiation when the output from the noticed cell is larger than the outputs from all adjacent detection cells.

In an embodiment, the outputs from the detection cells are corrected through weighting onto those outputs prior to the foregoing comparison.

In the embodiment, the weighting can be feedback-corrected depending upon a result of the position detection.

In another embodiment, the device further includes an energy discriminator for preventing said noticed cell from being mistaken as representing an incident position when the output from the noticed cell lies outside a predetermined range.

A two-dimensional incident position detector device according to the present invention comprises in another aspect an adder for doing the sum of outputs from all detection cells adjacent to a noticed cell, a multiplier for multiplying an output from the notice cell by a predetermined value corresponding to the number of the adjacent cells, a comparator for comparing an output from the multiplier with an output from the adder, and means for determining a position of the noticed cell as an incident position when the output from the multiplier is larger than the output from the adder.

Herein, the foregoing predetermined value can be selected to be larger than the number of the adjacent cells.

A two-dimensional incident position detector device according to the present invention comprises in further another aspect an adder for doing the sum of outputs from all detection cells adjacent to a noticed cell, a divider for dividing an output from the adder by a predetermined value corresponding to the number of the adjacent cells, a comparator for comparing an output from the noticed cell with an output from the divider, and means for determining a position of the noticed cell as an incident position when the output from the noticed cell is larger than the output from the divider.

Herein, the foregoing predetermined values can be selected to be smaller then the number of the adjacent cells.

In accordance with the present invention, an output from the noticed detection cell is compared with outputs from all adjacent detection cells, and the position of the noticed cell is decided as an incident position when the output from the noticed cell is larger than the outputs from all adjacent detection cells. it can therefore be avoided to suffer from complicated arithmetic operation or one-dimensionally successive reading out of input information as in the prior cases, and it is instead possible to decide a two-dimensional incident position at a stroke. It is thus possible to effectually read a two-dimensional incident position at a high speed (at a high counting rate). The present device can also deal with a multi-event phenomenon. Additionally, whatever the spreading of an incident signal is, e.g., even with the broader spreading, the incident position can accurately be detected.

In an embodiment, the output from the detection cell is weighted and hence corrected prior to the comparing operation. Therefore, variations of the characteristics of the detector array as well as those of the characteristics of the individual detection cell can be corrected with ease by changing the weighting factor composed on each detection cell and satisfactory resolution can be achieved.

Additionally, the weighting can be fed back and corrected depending upon a result of the position detection. In this case, proper weighting can be achieved in response to a result of actual position detection and the weighting can simply be corrected, thus assuring satisfactory resolution.

Further, an energy discriminator can be provided for preventing the determination of the incident position from being mistaken when the output from the noticed cell falls outside a predetermined region. This assures noise elimination.

Still more, in another embodiment the output from the noticed detection cell is multiplied by a predetermined value corresponding to the number of all detection cells adjacent to the noticed cells. The position of the noticed cell is determined as an incident position when the multiplied value is larger than the sum of the outputs from all adjacent cells. In this case, no comparison is required between the output from the noticed cell and the output from each adjacent cell, and thus the construction of the device is simplified.

Particularly, when the foregoing predetermined value is set larger than the number of the adjacent cells, the incident position can relatively accurately be detected even with the incident signal being more widely spread.

Additionally, in still another embodiment the sum of the outputs from all detection cells adjacent to the noticed cell is divided by a predetermined value corresponding to the number of the adjacent cells. The position of the noticed cell is determined as an incident position when the output from the noticed cell is larger than the divided value. In this case also, there is no need of comparing the output from the noticed cell with the output from each adjacent cell, and hence the constrution is simplified.

Particularly, where the foregoing predetermined value is set smaller than the number of the adjacent cells, the incident position can relatively accurately be detected even with the incident signal being more widely spread.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENTS

In what follows embodiments of the present invention will be described in detail with reference to the accompanying dawings.

Figure 1:
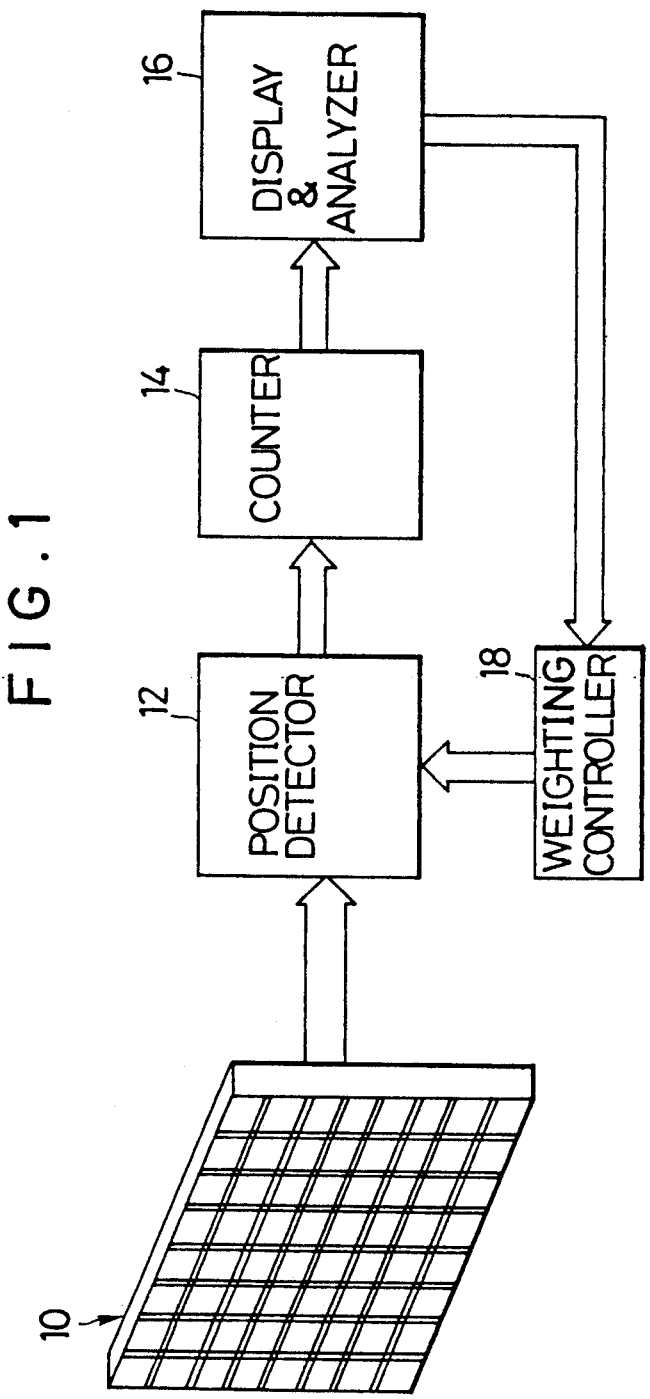
FIG. 1 is a block diagram illustrating the overall construction of a first embodiment of a two-dimensional incident position detector device according to the present invention.

Referring to FIG. 1, a first embodiment of a two-dimensional incident position detector device of the present invention is illustrated.

The two-dimensional incident position detector device comprises a detector array 10 including a plurality of two-dimensional n×n detection cells for example, a position detector section 12 including a comparator circuit for weighting an output from each detection cell and thereafter comparing the just-mentioned weighted output with weighted outputs from all other detection cells and determination means for determining the position of a noticed detection cell as an incident position of light or radiation when an output from the noticed cell is larger than any of the outputs from all adjacent detection cells, a counter section 14 for incrementing a counter corresponding to the noticed cell depending upon a result of determination of the incident position from the position detector section 12 and storing the counted value, a display/analyzer section 16 for displaying and analyzing the counted value for each detection cell stored in the counter section 14, and a weighting controller section 18 for feeding back for correction the weighting in the position detector section 12 depending upon a difference between an actual incident position and an output result into the detector array 10 by the display/analyzer section 16.

Figure 2:
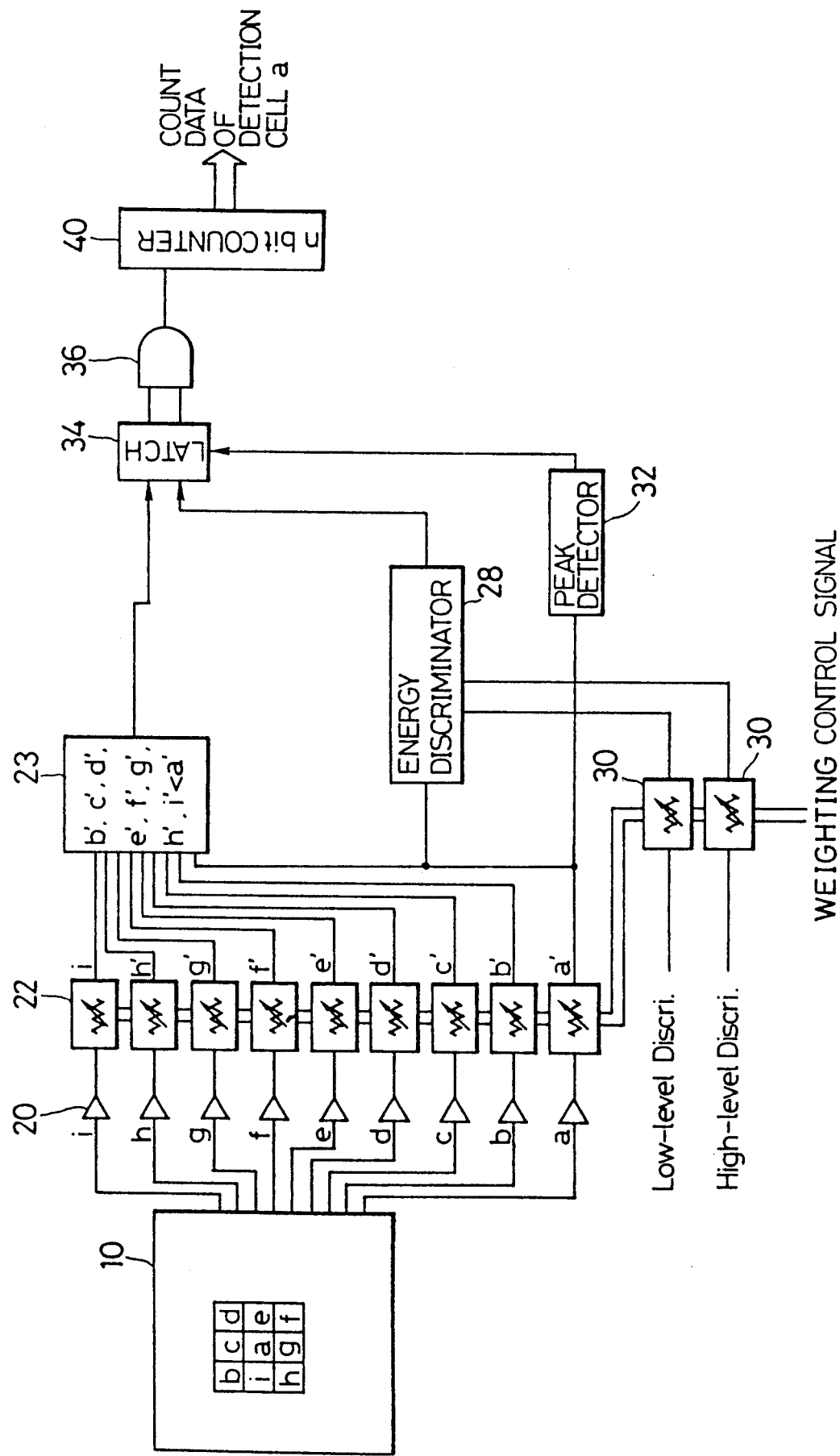
FIG. 2 is a block diagram illustrating the construction of a position detector section in the first embodiment.

The position detector section 12 comprises, as illustrated in FIG. 2 for example, a preamplifier 20 for amplifying the output from each detection cell a to i, a weighting unit 22 for weighting an output from the preamplifier 20 in response to the characteristics (variations of sensitivity) of each detection cell, a comparator circuit 23 for comparing an output a' of the noticed cell a (for example) and outputs b' to i' of the detection cells other than the output of the noticed cell a among outputs from the weighting unit 22, and detecting a fact that the weighted output a' from the noticed cell is larger than the weighted outputs b' to i' from all other adjacent cells, and energy discriminator 28 for detecting that the weighted output a' from the noticed cell falls within a given range, a weighting unit 30 for weighting the upper and lower limits of the given range of the energy discriminator 28, a peak detector 32 for detecting the peak of the weighted output a' from the noticed cell, a latch circuit 34 for latching the outputs from the comparator circuit 23 and the energy discriminator 28 in timing of peak detection by the peak detector 32, and an AND gate 36 for issuing a clock to an n bit counter 40 corresponding to the noticed cell a for the first time when the outputs from the comparator circuit 23 and the energy discriminator are both active to increment the counter 40 and issue a signal for recording the incidence of light or radiation.

Figure 3:
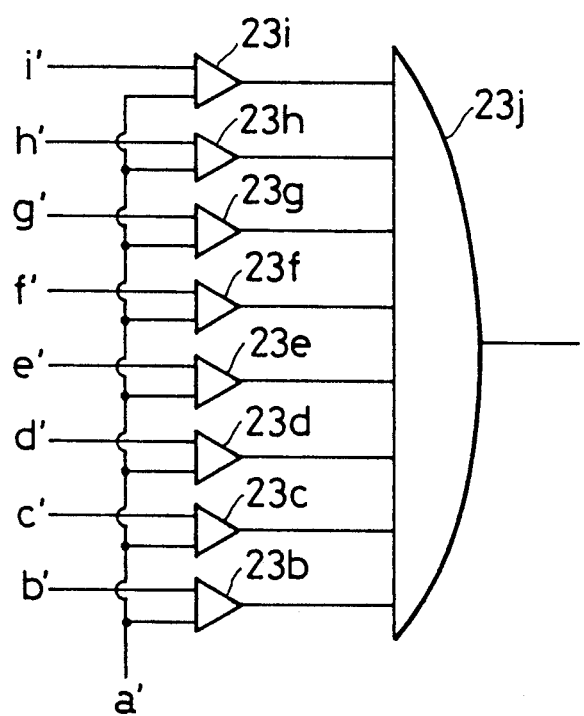
FIG. 3 is a circuit diagram illustrating the construction of a comparator circuit for use in the position detector section.

The comparator circuit 23 comprises, as illustrated in FIG. 3 for example, comparators 23b to 23i for comparing the weighted outputs b' to i' from the adjacent cells with the weighted output a' from the noticed cell, respectively, and an 8 input AND gate 23j for example which is active when results of comparisons by the comparators 23b to 23i are all active, i.e., when the weighted output a' from the noticed cell is larger than any of the weighted outputs b' to i' from all adjacent cells.

Herein, although FIG. 2 simply illustrates only the surroundings of the noticed cell a, the present embodiment is constructed with the same n×n constructions corresponding to all n×n detection cells. Herein, care must be taken of a fact that five adjacent cells are located at the edge of the detection array and three adjacent cells at the corner of the same.

Operation of the first embodiment is as follows.

The outputs of the individual detection cells of the detector array 10 are all transmitted to the position detector section 12. The position detector section 12 weights the outputs from the detection cells on the basis of the characteristics of the individual cells. Thereafter, all detection cell outputs are compared with the outputs from the adjacent detection cells located around the noticed detection cell. If the (noticed) detection cell output at the center of the adjacent detection cells is maximum, then the noticed detection cell is judged to represent an incident position of light or radiation and counted value corresponding to the noticed detection cell is incremented by the counter section 14.

More specifically, light or radiation is assumed to be incident upon the detector array 10 at the center a of an arbitrary 3×3 array in the detector array 10. Outputs a to i from the detection cells are amplified by the preamplifier 20 and then weighted by the weighting unit 22 in conformity with the characteristics of the detection cells (variations of sensitivities) to provide weighted outputs a' to i'. Then, in the comparator circuit 23, the weighted output a' from the noticed cell a is compared with the weighted outputs b' to i' respectively from the cells b to i adjacent to the noticed cell a. Assumed now the noticed cell a to be an incident position, the weighted output a' from the noticed cell is larger than any of the weighted outputs b' to i' from the other adjacent cells b to i. Accordingly, all individual results of comparisons show that the weighted output a' from the noticed cell a is larger than the other outputs, and hence the output of the comparator circuit 23 becomes active.

On the other hand, the weighted output a' from the noticed cell a is compared with high and low levels by the energy discriminator 28. If the weighted output a' lies within a set energy window, then an output from the energy discriminator 28 becomes active. Hereby, noise elimination and energy restriction at an arbitrary level are established. Additionally, if an energy level is weighted by the weighting unit 30, a different energy window may be set for each detection cell.

The outputs from the comparator circuit 23 and the energy discriminator 28 are latched in the timing of a peak obtained by peak detection from the output a' of the noticed cell. If both outputs are active, an output from the AND gate 36 becomes active for the first time. Hereby, the AND gate 36 provides a clock to the n bit counter 40 corresponding to the detection cell a to increment the counter 40 for recording a fact that light or radiation is incident on the noticed cell a.

Since detection of a position on the detector array 10 where light or radiation enters is processed parallelly as described, a multi-event may also be processed.

Counted values stored in the counter section 14 for each detection cell are all transmitted to the display/analyzer 16 for display and analyses.

Furthermore, the weighting controller section 18 feeds back a difference between an actual incident position onto the detector array 10 and an output result from the same to optimize the weighting by the position detector 12 for each cell. More specifically, the display/analyzer 16 supplies as a weighting control signal a correction signal yielded from an error between the actual incident position and the output result to the weighting units 22, 30 to alter the weighting for each detection cell for correcting the output from each detection cell.

In accordance with the first embodiment, an incident position of light or radiation can be detected accurately whatever the spreading of an incident signal is or even when it is widely broadened.

Herein, when it is desirous to obtain a resolution less than a cell pitch, the present invention may be combined with the prior method of position estimation. It is also possible for example that a noticed array is taken out by searching the whole region at high speed with the present invention, and thereafter an incident position is determined with a high resolution by application of the position estimation only to the noticed region.

Succeedingly, a second embodiment of the present invention will be described.

Figure 4:
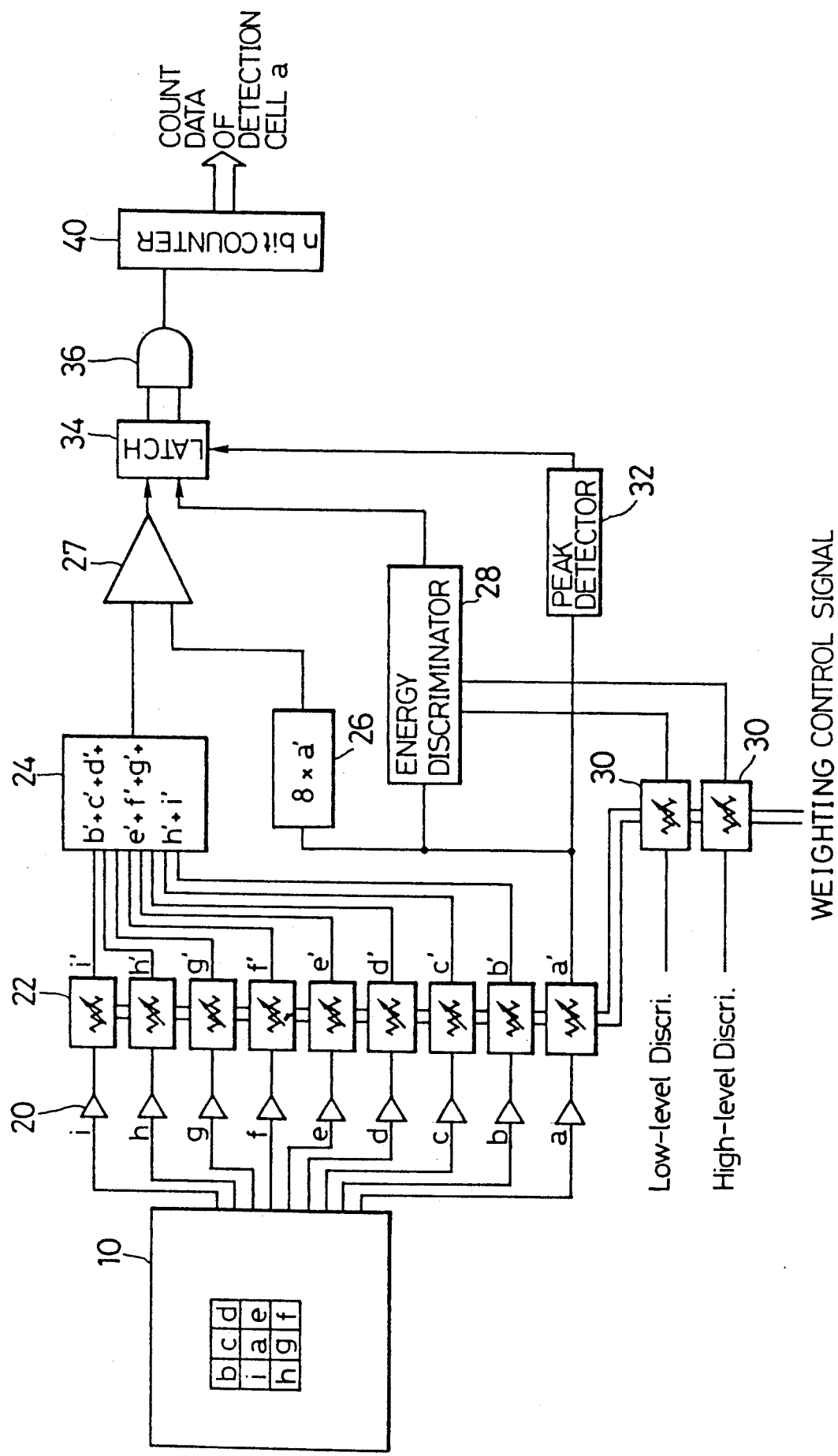
FIG. 4 is a block diagram illustrating the construction of a position detector section in a second embodiment of the present invention.

A two-dimensional incident position detector devise in the present embodiment has a basic construction as shown in FIG. 1, identical to that of the first embodiment. More specifically, the position detector section 12 of the second embodiment comprises, as illustrated in FIG. 4 for example and differing from the first embodiment, a preamplifier 20 and a weighting unit 22 both identical to the first embodiment, an analog adder 24 for adding weighted outputs b' to i' from adjacent cells other than a noticed cell a among outputs from the weighting unit 22, an analog multiplier 26 for multiplying the weighted output a' from the noticed cell among the outputs from the weighting unit 22 by a given value corresponding to the number of the adjacent cells (the number is 8 at a central portion shown in FIG. 4), a comparator 27 for detecting a fact that an output from the analog multiplier 26 is larger than an output from the analog adder 24, i.e., the weighted output a' from the noticed cell multiplied by the given value is larger than the sum of the weighted outputs b' to i' from all adjacent cells, and further comprises similarly to the first embodiment, an energy discriminator 28, a weighting unit 30, a peak detector 32, a latch circuit 34, and an AND gate 36.

Other constructions are identical to the first embodiment and the description will be omitted.

Operation of the second embodiment is as follows.

In the present embodiment, the weighted output a' from the noticed cell a in the detector array 10 is multiplied by the given value, 8 for example, through the analog multiplier 26. While the weighted outputs b' to i' from the cells b to i adjacent to the noticed cell a are added through the analog adder 24. Both outputs are then compared in the comparator 27. Assumed now the noticed cell a corresponds to the incident position, the weighted output a' from the noticed cell multiplied by the given value (by 8) is larger than the sum of the weighted outputs b' to i' from the other adjacent cells. Therefore, an output of the comparator 27 becomes active.

Other operation is the same as the first embodiment, and the description will be omitted.

In the present embodiment, it is unnecessary to compare the output from the noticed cell with the output from each adjacent cell, and the construction is simplified.

Succeedingly, a third embodiment of the present invention will be described.

Figure 5:
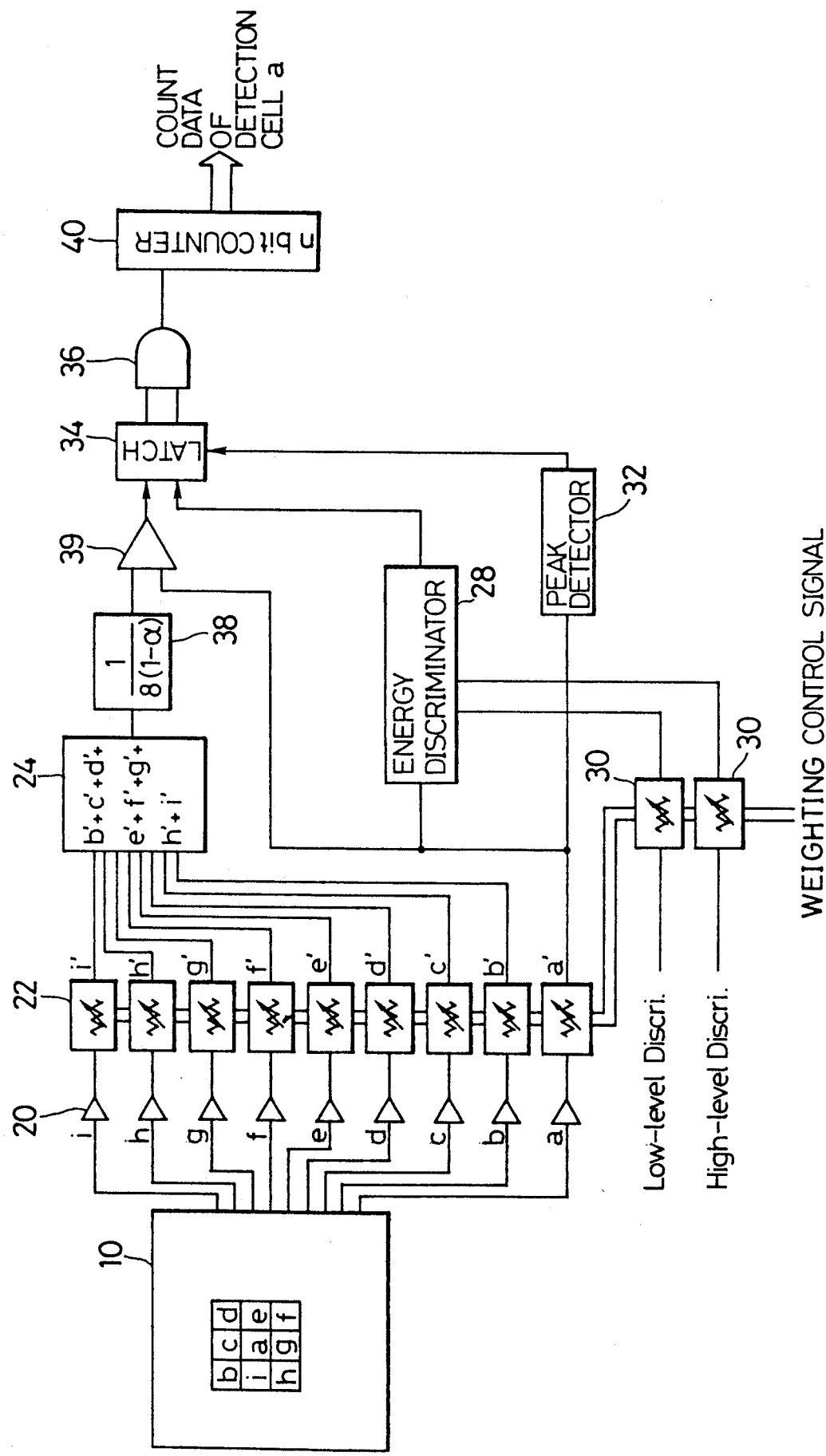
FIG. 5 is a block diagram illustrating the construction of a position detector section in a third embodiment of the present invention.
Figure 6:
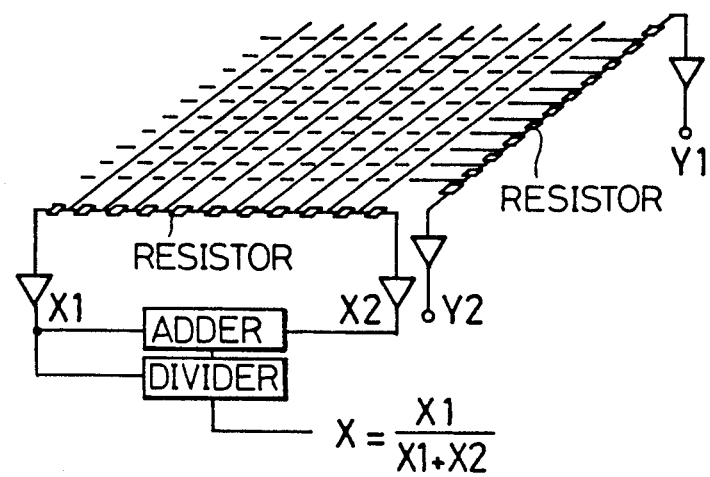
FIG. 6 is a prespective view illustrating the principle of a prior incident position detector device by a center-of-gravity position arithmetic operation system.
Figure 8:
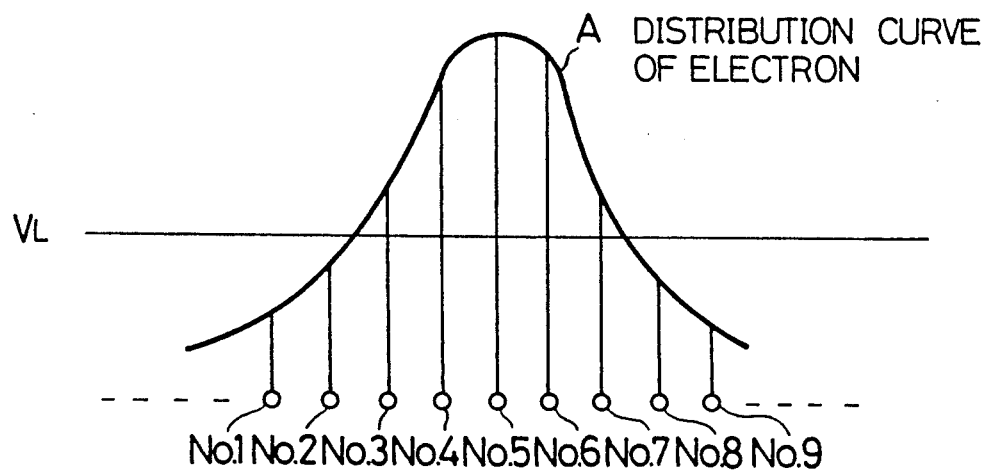
FIG. 8 is a diagram illustrating the principle of the device shown in FIG. 7.
Figure 7:
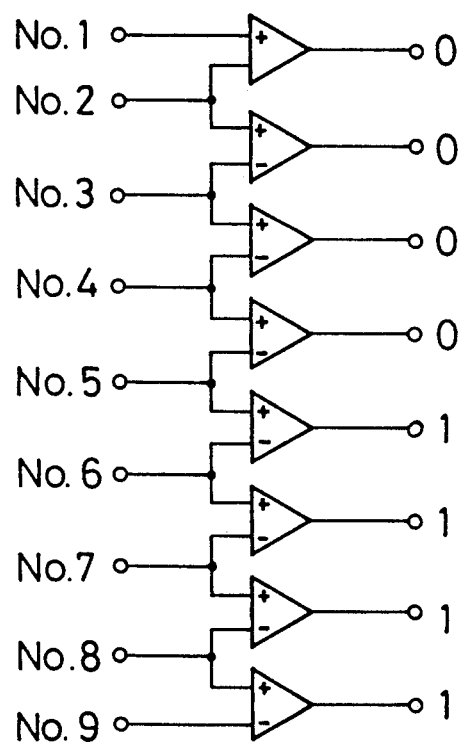
FIG. 7 is a block diagram illustrating the construction of a prior portion of an incident position detector device previously proposed by the applicant.

A two-dimensional incident position detector device in the present embodiment has a basic construction as shown in FIG. 1, identical to that of the first embodiment. More specifically, the position detector section 12 comprises, as illustrated in FIG. 5 and differing from the first and second embodiments, a preamplifier 20, a weighting unit 22, and an analog adder 24 all identical to the first and second embodiments, an analog divider 38 for dividing an output from the analog adder 24 by a given value $(8(1-\alpha)$ in the example of FIG. 5: herein $\alpha(1>\alpha>0)$ is a correction value set in conformity with the predicted spreading of an incident signal) corresponding to the number of adjacent cells (8 at a central portion shown in FIG. 5), a comparator 39 for detecting that the weighted output a' from the noticed cell is larger than an output from the analog divider 38, i.e. the weighted output a' from the noticed cell is larger than a given value which is larger by a correction value than the mean value of the weighted outputs b' to i' from all adjacent cells, and further comprises, similarly to the first and second embodiments, an energy discriminator 28, a weighting unit 30, a peak detector 32, a latch circuit 34, and an AND gate 36.

Other constructions are identical to the first and second embodiments, and the description will be omitted.

Operation of the third embodiment is as follows.

In the present embodiment, the weighted outputs b' to i' from the detection cells adjacent to the noticed cell a in the detector array 10 are added by the analog adder 24, and thereafter divided by the given value $8(1-\alpha)$ through the divider 38. Then, an output from the divider 38 is compared with the weighted output a' from the noticed cell in the comparator 39. Assumed now the noticed cell a corresponds to the incident position, the weighted output a' from the noticed cell is larger than the given value which is larger by a correction value than the average value of the weighted outputs b' to i' from the other adjacent cells. Therefor, an output of the comparator 39 becomes active.

Other operation is similar to the first and second embodiments and the description will be omitted.

In the present embodiment, similarly to the second embodiment, it is unnecessary to compare respectively the output from the noticed cell with the output from each adjacent cell, and the construction is simplified. Additionally, the given value for use in dividing an added value by the analog adder 24 is not just the number 8 of the adjacent cells, but a value which is yielded by correcting the number 8 by a correction value $\alpha$. Therefor, an incident position can relatively accurately be detected even with the spreading of an incident signal being broadened.

Herein, it is also possible to further improve the detection accuracy by learning and correcting the correction value $\alpha$ in conformity with a result of detection of the incident position.

Furthermore, if the given value (8) in the second embodiment, by which the weighted output a' from the noticed cell is multiplied through the analog multiplier 26, is taken as $8(1-\alpha)$ in terms of the correction value $\alpha$, the same advantage as the third embodiment can be achieved.

Although certain preferred embodiments have been shown and described, it should be understood that many changes and modifications may be made therein without departing from the scope of the appended claims.

What is claimed is:

1. A two-dimensional incident position detector device for radiation comprising:
   (a) a detector array including a plurality of detection cells in two-dimension arrangement;
   (b) comparator means for comparing an output from a noticed detection cell among said detection cells with outputs from all other detection cells adjacent to said noticed cell; and
   (c) incident position determining means for determining a position of said noticed cell as an incident position of radiation when the output from said noticed cell is larger than the outputs from all adjacent detection cells.

2. A two-dimensional incident position detector device according to claim 1 wherein the outputs from said detection cells are weighted prior to the comparison for correction thereof.

3. A two-dimensional incident position detector device according to claim 2 wherein said weighting is fed back for correction in conformity with a result of the position detection.

4. A two-dimensional incident position detector device according to claim 1 wherein an energy discriminator is provided for preventing said noticed cell from being mistaken as representing an incident position when the output from the noticed cell lies out of a given range.

5. A two-dimensional incident position detector device according to claim 1 wherein said comparator means comprises comparators for respectively comparing the outputs from the adjacent cells with the output from the noticed cell, and a multiple input AND gate whose output is active when results of the comparison by said comparators are all active.

6. A two-dimensional incident position detector device according to claim 1, further comprising means for searching whereby the whole array is searched at a high speed to take out a noticed region, and thereafter an incident position is determined with high resolution by application of a position estimation only to said noticed region.

7. A two-dimensional incident position detector device for radiation comprising:
   (a) a detector array including a plurality of detection cells in two-dimensional arrangement;
   (b) an adder for doing the sum of outputs from all detection cells adjacent to a noticed detection cell;
   (c) a multiplier for multiplying an output from said noticed cell by a given value corresponding to the number of the adjacent cells;
   (d) a comparator for comparing an output from said multiplier with an output from said adder; and
   (e) means for determining a position of said noticed cell as an incident position when the output from said multiplier is larger than the output from said adder.

8. A two-dimensional incident position detector device for radiation according to claim 7 wherein said given value is larger than the number of the adjacent cells.

9. A two-dimensional incident position detector device for radiation comprising:
   (a) a detector array including a plurality of detection cells in two-dimensional arrangement;
   (b) an adder for doing the sum of outputs from all detection cells adjacent to a noticed detection cell;
   (c) a divider for dividing an output from said adder by a given value corresponding to the number of the adjacent cells;
   (d) a comparator for comparing an output from said noticed cell with an output from said divider; and
   (e) means for determining a position of said noticed cell as an incident position when the output from said noticed cell is larger than the output from said divider.

10. A two-dimensional incident position detector device according to claim 9 wherein said given value is smaller than the number of the adjacent cells.

* * * * *